United States Patent
Neef et al.

(10) Patent No.: US 8,066,286 B2
(45) Date of Patent: Nov. 29, 2011

(54) METHOD OF SEALING A GAP USING MULTISTAGE BRUSH SEAL

(75) Inventors: Matthias Neef, Mülheim an der Ruhr (DE); Norbert Sürken, Mülheim a.d. Ruhr (DE); Karl Urlichs, Röthenbach (DE)

(73) Assignee: Siemens Aktiengesellschaft, Munich (DE)

( * ) Notice: Subject to any disclaimer, the term of this patent is extended or adjusted under 35 U.S.C. 154(b) by 711 days.

(21) Appl. No.: 12/223,086

(22) PCT Filed: Jan. 23, 2007

(86) PCT No.: PCT/EP2007/050626
§ 371 (c)(1),
(2), (4) Date: Jul. 22, 2008

(87) PCT Pub. No.: WO2007/085587
PCT Pub. Date: Aug. 2, 2007

(65) Prior Publication Data
US 2010/0276890 A1 Nov. 4, 2010

(30) Foreign Application Priority Data
Jan. 26, 2006 (EP) .................................. 06001644

(51) Int. Cl.
*F01D 11/02* (2006.01)
(52) U.S. Cl. ...................................................... 277/355
(58) Field of Classification Search .................... 277/355
See application file for complete search history.

(56) References Cited

U.S. PATENT DOCUMENTS

| | | | | |
|---|---|---|---|---|
| 885,032 | A * | 4/1908 | De Ferranti | 415/173.6 |
| 4,756,536 | A | 7/1988 | Belcher | |
| 5,106,104 | A | 4/1992 | Atkinson et al. | |
| 5,201,530 | A * | 4/1993 | Kelch et al. | 277/355 |
| 5,335,920 | A * | 8/1994 | Tseng et al. | 277/303 |
| 5,480,165 | A * | 1/1996 | Flower | 277/355 |
| 5,758,879 | A | 6/1998 | Flower | |
| 6,173,962 | B1 | 1/2001 | Morrison et al. | |
| 6,357,752 | B1 | 3/2002 | Lampes | |
| 7,503,164 | B2 * | 3/2009 | McMillan | 60/226.1 |
| 2004/0036227 | A1 | 2/2004 | Sarshar et al. | |
| 2005/0006851 | A1* | 1/2005 | Addis | 277/355 |
| 2005/0206087 | A1 | 9/2005 | Hogg et al. | |

FOREIGN PATENT DOCUMENTS

| | | |
|---|---|---|
| EP | 0992721 A1 | 4/2000 |
| EP | 1271021 B1 | 1/2003 |
| GB | 2393223 A | 3/2004 |
| JP | 63152771 A | 6/1988 |
| JP | 08006609 A | 1/1996 |
| JP | 2004084951 A | 3/2004 |

* cited by examiner

Primary Examiner — Shane Bomar
Assistant Examiner — Robert E Fuller

(57) ABSTRACT

The invention relates to a multistage brush seal of a steam turbine that comprises several brushes which in turn comprise several bristles. A plurality of brushes are arranged next to each other and are configured different from each other with regard to the length of the bristles, or to the bristle thicknesses, or to the bristle rigidities, or to the lay angle of the bristles, or to the height of a first guard ring in front of or behind the brush seal in the flow direction, which delimits this brush seal, or to a gap between the bristles and an opposing surface.

14 Claims, 1 Drawing Sheet

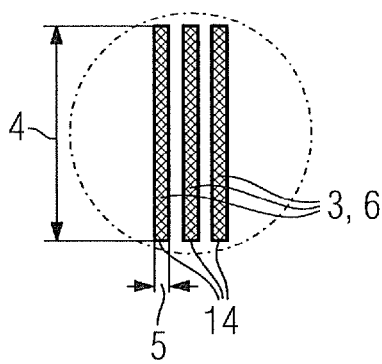
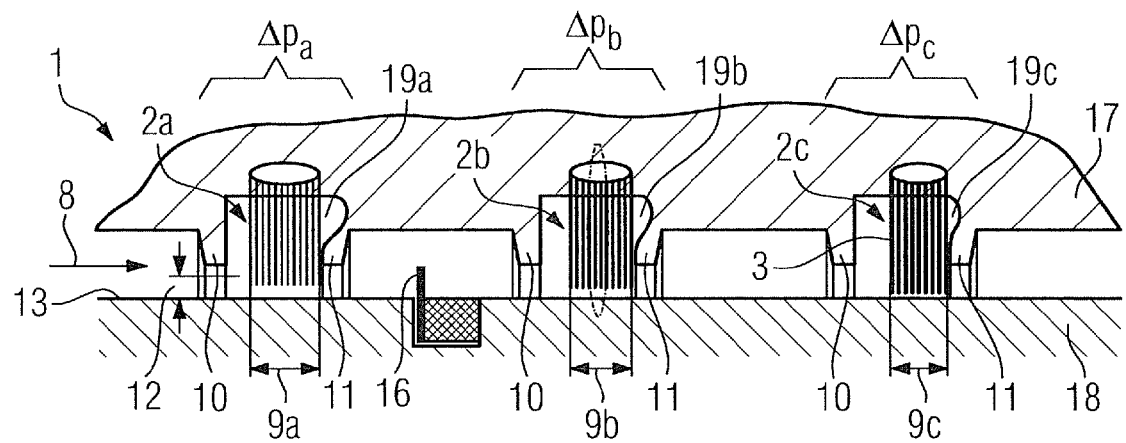
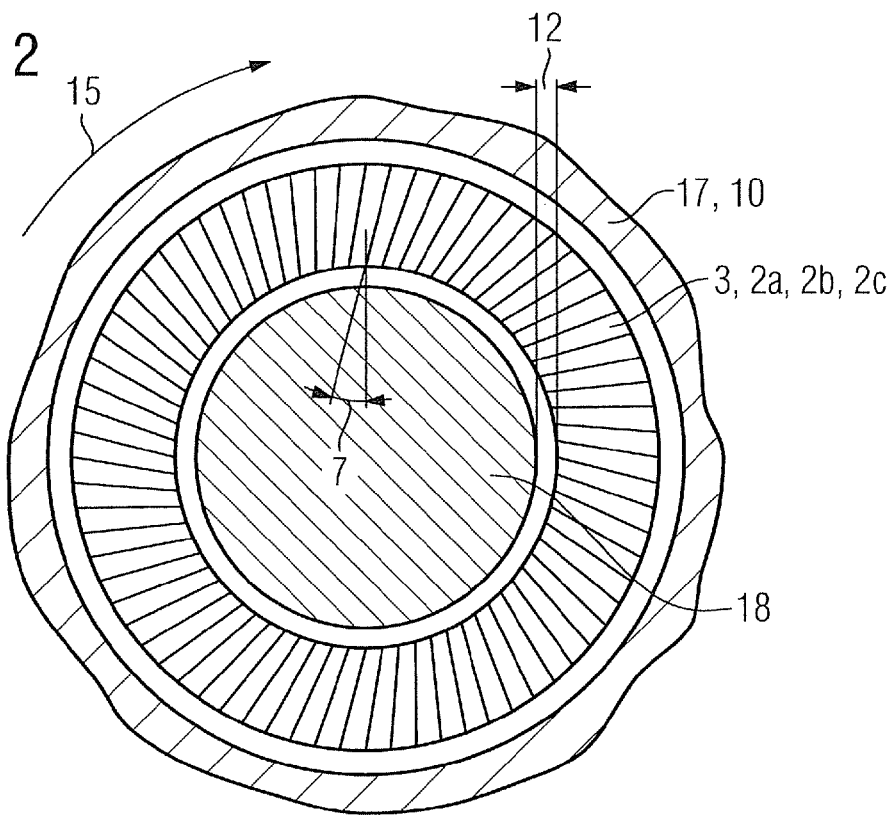

METHOD OF SEALING A GAP USING MULTISTAGE BRUSH SEAL

CROSS REFERENCE TO RELATED APPLICATIONS

This application is the US National Stage of International Application No. PCT/EP2007/50626 filed Jan. 23, 2007 and claims the benefit thereof. The International Application claims the benefits of European application No. 06001644.1 filed Jan. 26, 2006, both of the applications are incorporated by reference herein in their entirety.

FIELD OF THE INVENTION

The invention relates to a multistage brush seal of a steam turbine, wherein the brush seal comprises a plurality of brushes which have a plurality of bristles in each case.

BACKGROUND OF THE INVENTION

Brush seals also find frequent use in addition to labyrinth seals for sealing against the escape of fluids through gaps between rotors and stationary components. Brush seals in this case are particularly tolerant to a falling short of the radial clearance between the rotating component and the stationary component. The bristles of the brushes flexibly yield in the case of a falling short of the radial clearance and of a rubbing of the seal on the rotating shaft, and flexible yielding of the bristles and non-destructive wear on the bristles occur if the contact between the stationary bristles and the rotating component lasts for a longer time. In addition, a brush is well suited to absorb a pressure difference and in this way to efficiently reduce the leakiness of the seal. For overcoming larger pressure differences, brush seals, as well as labyrinth seals, are formed in a multistaged configuration so that a plurality of brushes, by arranging free spaces between the brushes, absorb a certain pressure difference until relieving to the ambient pressure. The flow direction, in the sense of the invention, in this case is the direction of the pressure decay from a high pressure level to a low pressure level, consequently the only possibility of a fluid movement in the region of the brush seal.

A brush seal arrangement is already known from European printed patent specification EP 1 271 021 B1. Such conventional arrangements have the serious disadvantage that as a result of pressure differences across the individual brushes which are simply difficult to predict, an exceptionally conservative layout has to follow and therefore for example more stages or brushes than necessary have to be provided in order to satisfy the theoretical requirements.

SUMMARY OF THE INVENTION

The invention, therefore, has made it its object to create a brush seal which enables a more accurate prediction of the pressure difference across the individual stages or brushes and therefore also allows a more accurate dimensioning of the brush seal, taking advantage of potential savings.

To achieve this, it is proposed that the brushes, which are arranged one behind the other in the flow direction, differ from each other with regard to the length of the bristles, or to the bristle thicknesses, or to the bristle rigidities, or to the lay angle of the bristles, or to the height of a first guard ring in front of or behind the brush seal in the flow direction, which delimits this brush seal, or to a gap between the bristles and an opposing surface. The defined difference between the individual brushes, for example with regard to the length of the bristles, leads to a more accurate predictability of the ratios of the pressure decay across the individual brushes which are arranged one behind the other. Also, prediction of the wear behavior, or wear over the operating period, and of the leakage which occurs as a result, is very much more accurately possible. In this way, the service life of the brushes can also be better optimized.

An advantageous development of the invention provides that brushes which are arranged at the front in the flow direction have a greater overall height, i.e. bristle length and consequently also increased rigidity of the length of the bristles, than the brushes which are arranged behind them. In this way, the maximum pressure decay takes place through the first stage or brush in the flow direction. In this case, it is important that a defined pressure decay occurs across the individual brushes, and in this way the operating behavior is more accurately predictable. An especially ideal characteristic of the pressure decay in this case is provided if identical differential pressures are applied to the individual brushes of the multistage arrangement.

If the brushes which lie at the front in the flow direction are more heavily loaded, then allowance for it can be made by the front stages of the brush seal having a greater bristle bundle thickness than the subsequent stages, i.e. by the bristle bundle thickness varying in the flow direction.

In particular, by the longitudinal staggering of the bristles over the different brushes in the direction of flow of the leakage fluid, it is expedient if brushes which are arranged at the front in the flow direction have thinner bristles than brushes which are arranged behind them. Thus, it is possible, for example, that despite the longer bristles similar rigidities in the brushes are achieved and in this way the desired pressure difference results. In the same sense, it can be advantageous if brushes which are arranged at the front in the flow direction have a lesser rigidity of the bristles than the brushes which are arranged behind them. The greater flexibility of the forward-lying brushes for example can bring about an improved action of the "blow-down effect" during operation.

In particular, a reducing flatness of the lay angle in the flow direction across the different brushes aims at a controlled variation of the "blow-down effect". A controlled variation of this parameter between the individual brushes leads to a predictability of the behavior of the brush in the case of increasing pressure difference.

The influence of friction between the individual bristles of the brush can be better controlled if guard rings or support rings, which are provided in front of and after the brush in the flow direction and protect the bristles on the inflow side and support them on the outflow side, are purposefully varied in height so that some brushes of the arrangement react more flexibly to changes of the flow conditions, and others remain more rigid as a result of increased friction between the bristles. In the case of the individual brush, the guard ring can be constructed with a smaller gap to the rotor than the support ring in order to favorably influence the blow-down effect.

The design of a chamber in the support ring of the brush, which is known as the pressure relief zone, has a further influence on the pressure difference of the brush and on the corresponding leakage. This enables a better functioning of the blow-down effect, especially in the case of greater pressure differences. In the present example, the design of the relief zone for the stages of the multistage arrangement on the outflow side therefore plays a decisive role, whereas the brushes on the inflow side can be provided with little or no pressure relief.

In addition, it may be advisable if brushes which are arranged at the front in the flow direction have a smaller distance of the bristle points to the opposing rotor surface than brushes, or some brushes which are arranged behind them have a length of the bristles which leads to a stronger abutting of the bristles upon the opposing surface than with other brushes or bristles.

A further possibility of more accurately predicting the pressure differences across the individual stages or brushes is that of increasing the axial distance between the brushes in the flow direction from brush to brush. In this way, seal points which extend in the circumferential direction can also be provided between brushes so that a combination of labyrinth seal and brush seal ensues, and the advantages of the brush seal with regard to tolerance in relation to the falling short of the radial clearance are maintained.

BRIEF DESCRIPTION OF THE DRAWINGS

In the following, a special exemplary embodiment is described with reference to drawings for clarification. For the person skilled in the art, numerous further variants of the invention are produced in addition to the exemplary embodiment. In the drawing:

FIG. 1A shows a section through a rotor, a stator and a brush seal according to the invention.

FIG. 1B shows a schematic drawing of bristles for a brush seal.

FIG. 2 shows an axial (in the flow direction) view of a brush seal.

DETAILED DESCRIPTION OF THE INVENTION

FIG. 1A shows a brush seal 1 which seals a gap 12 between a rotor 18 and a stator 17. The brushes 2a, 2b, 2c are arranged one behind the other in a flow direction 8. Different differential pressures $\Delta pa$, $\Delta pb$, $\Delta pc$ develop in each case on the three brushes 2a, 2b, 2c, wherein the pressure difference $\Delta p$ on the brushes 2a, 2b, 2c increases in the flow direction 8. This effect is achieved by the brushes 2a, 2b, 2c differing with regard to the length 4 (FIG. 1B) of their bristles, to the bristle thickness 5 (FIG. 1B), to the bristle rigidity 6, to the lay angle 7, with regard to the gap 12 between the bristle points 14 (FIG. 1B) and the surface 13, and with regard to the lay angle 7 which is created in the circumferential direction 15. The first brush 2a has the longest bristles 3 combined with the lowest bristle rigidity 6 and the smallest bristle thickness 5.

The brushes 2a, 2b, 2c have different bristle bundle thicknesses 9a, 9b, 9c to each other. The bristle bundle thickness 9a, 9b, 9c reduces from brush 2a, 2b, 2c to brush 2a, 2b, 2c in the flow direction.

In addition, the brushes have a pressure relief zone (19a, 19b, 19c) in each case in the region of their attachment. The pressure relief zone (19a, 19b, 19c) varies from brush 2a, 2b, 2c to brush 2a, 2b, 2c in its size in such a way that the first brush 2a, 2b, 2c in the flow direction has the largest pressure relief zone and the last brush 2a, 2b, 2c has the smallest pressure relief zone (19a, 19b, 19c).

In this case, both the first guard ring 10 and the second guard ring 11 are formed smaller in height than in the case of the subsequent brush 2b or of the last brush 2c. The gap 12 between the opposing surface 13 and the bristle points 14 has the radially widest extent compared with the subsequent brushes 2b and 2c.

The invention claimed is:

1. A multistage seal of a steam turbine for sealing a gap between a stator and a rectilinear surface of a rotor, comprising:
    a plurality of brush seals arranged next to each other, each having a plurality of bristles, a first guard ring in front of the bristles in a flow direction, a second guard ring after the bristles in the flow direction, and a pressure compensating zone,
    wherein the brush seals are substantially different from each other with regard to:
    lengths of the bristles,
    thicknesses of the bristles,
    rigidities of the bristles,
    bristle bundle thickness,
    lay angles of the bristles,
    size of the pressure compensating zones,
    height of the first guard rings,
    height of the second guard rings, and
    distances between the bristles and the rectilinear surface.

2. The seal as claimed in claim 1, wherein the lengths of the bristles of the brush seals arranged at front in the flow direction are longer than the lengths of the bristles of the brush seals arranged behind.

3. The seal as claimed in claim 1, wherein the thicknesses of the bristles of the brush seals arranged at front in the flow direction are thinner than the thicknesses of the bristles of the brush seals arranged behind.

4. The seal as claimed in claim 1, wherein the rigidities of the bristles of the brush seals arranged at front in the flow direction are lesser than the rigidities of the bristles of the brush seals arranged behind.

5. The seal as claimed in claim 1, wherein the bristle bundle thickness of the brush seals arranged at front in the flow direction are thicker than the bristle bundle thickness of the brush seals arranged behind.

6. The seal as claimed in claim 1, wherein the lay angles of the bristles of the brush seals arranged at front in the flow direction are flatter than the lay angles of the bristles of the brush seals arranged behind.

7. The seal as claimed in claim 1, wherein the pressure compensating zones of the brush seals arranged at front in the flow direction are larger than the pressure compensating zones of the brush seals arranged behind.

8. The seal as claimed in claim 1, wherein the height of the first guard rings of the brush seals arranged at front in the flow direction are smaller than the height of the first guard rings of the brush seals arranged behind.

9. The seal as claimed in claim 1, wherein the height of the second guard rings of the brush seals arranged at front in the flow direction are smaller than the height of the second guard rings of the brush seals arranged behind.

10. The seal as claimed in claim 1, wherein the distances of the bristles of the brush seals arranged at front in the flow direction are smaller than the distances of the bristles of the brush seals arranged behind.

11. The seal as claimed in claim 1, wherein axial distances between the brush seals increase in the flow direction.

12. The seal as claimed in claim 1, further comprising a seal point that is arranged between the brush seals and extends in a circumferential direction of the brush seal.

13. The seal as claimed in claim 1, wherein the first and the second guard rings delimit the brush seals.

14. A method for sealing a gap between a stator and a rectilinear surface of a rotor in a steam turbine, comprising:
    providing a multistage seal comprising a plurality of brush seals arranged next to each other, each brush seal having a plurality of bristles, a first guard ring in front of the bristles in a flow direction, a second guard ring after the bristles in a flow direction, and a pressure compensating zone, the brushes being substantially different from each other with regard to:
lengths of the bristles,
thicknesses of the bristles,
rigidities of the bristles,
bristle bundle thickness,
lay angles of the bristles,
size of the pressure compensating zones,
height of the first guard rings,
height of the second guard rings, and
distances between the bristles and the rectilinear surface; and
sealing the gap by the multistage seal.

* * * * *